US012671951B2

(12) United States Patent
Law et al.

(10) Patent No.: US 12,671,951 B2
(45) Date of Patent: Jun. 30, 2026

(54) DIRECTIONALLY DEPENDENT ACOUSTIC STRUCTURE FOR AUDIO PROCESSING RELATED TO AT LEAST ONE MICROPHONE SENSOR

(71) Applicant: SHURE ACQUISITION HOLDINGS, INC., Niles, IL (US)

(72) Inventors: Daniel Law, Glencoe, IL (US); Michael Lester, Buena Vista, CO (US)

(73) Assignee: Shure Acquisition Holdings, Inc., Niles, IL (US)

(*) Notice: Subject to any disclaimer, the term of this patent is extended or adjusted under 35 U.S.C. 154(b) by 147 days.

(21) Appl. No.: 18/660,433

(22) Filed: May 10, 2024

(65) Prior Publication Data

US 2024/0381047 A1 Nov. 14, 2024

Related U.S. Application Data

(60) Provisional application No. 63/501,569, filed on May 11, 2023.

(51) Int. Cl.
*H04S 7/00* (2006.01)
*H04R 5/027* (2006.01)

(52) U.S. Cl.
CPC ............ *H04S 7/302* (2013.01); *H04R 5/027* (2013.01); *H04S 2400/11* (2013.01); *H04S 2400/15* (2013.01)

(58) Field of Classification Search
CPC .. H04S 7/302; H04S 2400/11; H04S 2400/15; H04S 7/304; H04R 5/027
USPC ............................................ 381/303, 1, 300
See application file for complete search history.

(56) References Cited

U.S. PATENT DOCUMENTS

| | | | | |
|---|---|---|---|---|
| 9,980,075 | B1 * | 5/2018 | Benattar | H04S 7/303 |
| 12,526,598 | B2 * | 1/2026 | Thomas | H04S 7/303 |
| 2011/0129105 | A1 | 6/2011 | Choi et al. | |
| 2015/0030192 | A1 | 1/2015 | Edwards et al. | |
| 2018/0146319 | A1 | 5/2018 | Benattar | |
| 2018/0263562 | A1 | 9/2018 | Laplante-Lévesque et al. | |
| 2020/0137508 | A1 | 4/2020 | Lee et al. | |
| 2020/0374647 | A1 | 11/2020 | Cappello et al. | |
| 2021/0274296 | A1 | 9/2021 | Rohde et al. | |
| 2022/0038832 | A1 | 2/2022 | Khaleghimeybodi et al. | |

(Continued)

FOREIGN PATENT DOCUMENTS

| | | |
|---|---|---|
| CN | 101658050 A | 2/2010 |
| CN | 101938686 A | 1/2011 |
| CN | 103370949 A | 10/2013 |

(Continued)

*Primary Examiner* — Thjuan K Addy
(74) *Attorney, Agent, or Firm* — Alston & Bird LLP

(57) ABSTRACT

Techniques for providing a directionally dependent acoustic structure for audio processing related to at least one microphone sensor are discussed herein. Examples may include transforming an augmented audio signal defined by a directionally dependent acoustic structure positioned proximate to at least one microphone sensor into at least one audio data object set, inputting the at least one audio data object set to a model configured to generate at least one spatialization data structure indicative of spatialization information for at least one audio source located within the audio environment, and generating audio processing data based at least in part on the at least one spatialization data structure.

20 Claims, 6 Drawing Sheets

(56) References Cited

U.S. PATENT DOCUMENTS

| | | | | |
|---|---|---|---|---|
| 2023/0093585 | A1* | 3/2023 | Faundez Hoffmann | G10L 25/18 704/200 |
| 2023/0308827 | A1* | 9/2023 | Shin | H04S 7/303 |

FOREIGN PATENT DOCUMENTS

| | | | |
|---|---|---|---|
| CN | 105997448 | A | 10/2016 |
| CN | 108174320 | A | 6/2018 |
| CN | 109031200 | A | 12/2018 |
| CN | 109044364 | A | 12/2018 |
| CN | 110677802 | A | 1/2020 |
| CN | 110740413 | A | 1/2020 |
| CN | 113849767 | A | 12/2021 |
| CN | 114305403 | A | 4/2022 |
| EP | 3883266 | A1 | 9/2021 |
| JP | 2001-525141 | A | 12/2001 |
| KR | 2006-0130919 | A | 12/2006 |
| KR | 2009-0049761 | A | 5/2009 |
| KR | 2011-0060182 | A | 6/2011 |
| KR | 10-2020-0042874 | A | 4/2020 |

* cited by examiner

DIRECTIONALLY DEPENDENT ACOUSTIC STRUCTURE FOR AUDIO PROCESSING RELATED TO AT LEAST ONE MICROPHONE SENSOR

CROSS REFERENCE TO RELATED APPLICATIONS

This application claims the benefit of U.S. Provisional Patent Application No. 63/501,569, titled "DIRECTIONALLY DEPENDENT ACOUSTIC STRUCTURE FOR AUDIO PROCESSING RELATED TO AT LEAST ONE MICROPHONE SENSOR," and filed on May 11, 2023, the entirety of which is hereby incorporated by reference.

TECHNICAL FIELD

Embodiments of the present disclosure relate generally to audio processing and, more particularly, to utilizing directionally dependent acoustics structures for audio processing related to audio signals.

BACKGROUND

An array of microphones may be employed to capture audio from an audio environment. Respective microphones of an array of microphones are often located at fixed positions within an audio environment and often employ beamforming to capture audio from a source of audio. However, it is generally desirable to improve audio processing related to a source of audio captured by an array of microphones within an audio environment.

BRIEF SUMMARY

Various examples of the present disclosure are directed to apparatuses, systems, methods, and computer readable media for providing a directionally dependent acoustic structure for audio processing related to at least one microphone sensor. These characteristics as well as additional features, functions, and details of various examples are described below. The claims set forth herein further serve as a summary of this disclosure.

BRIEF DESCRIPTION OF THE DRAWINGS

Figure 1:
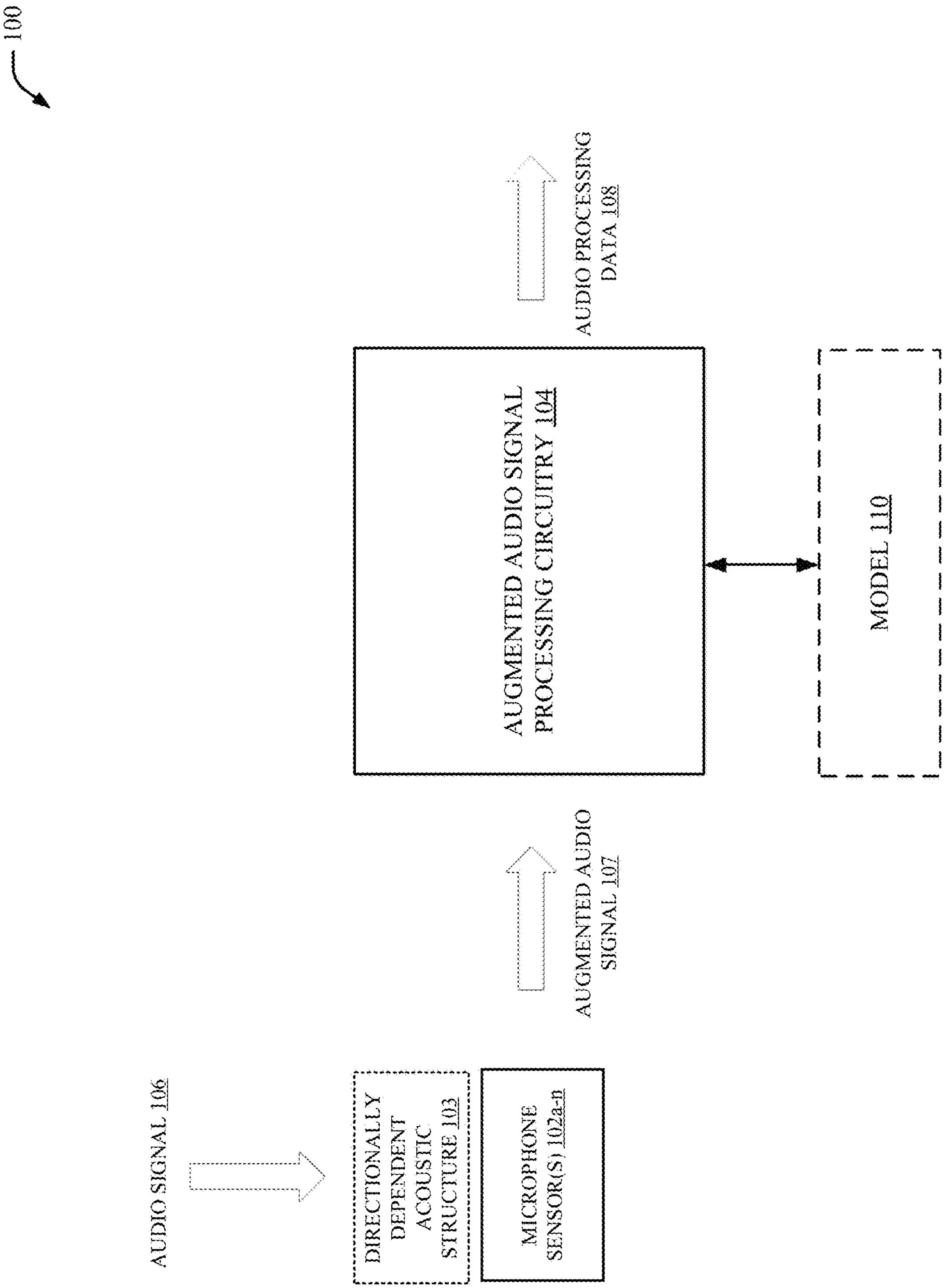
Figure 2:
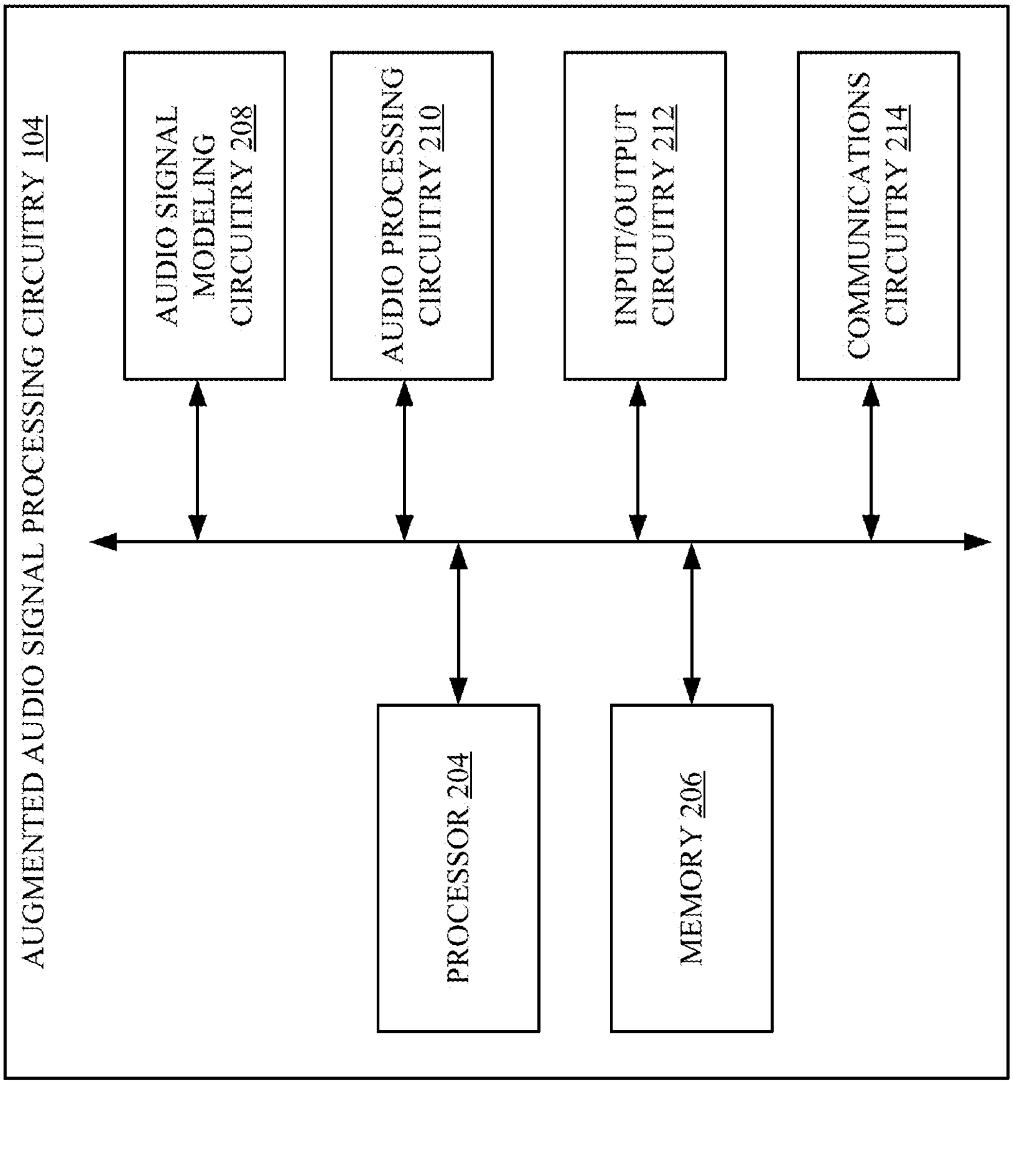
Figure 3:
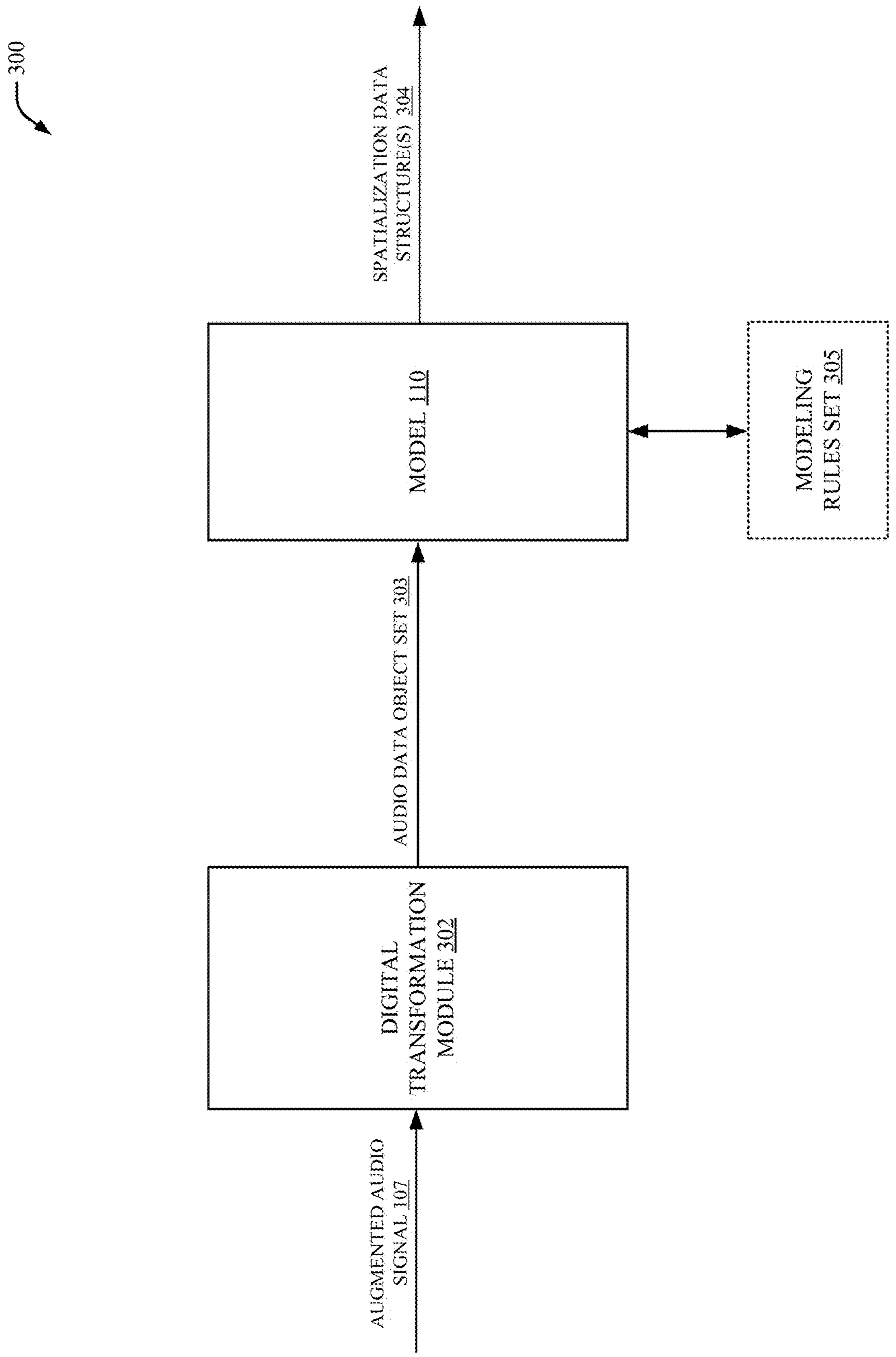
Figure 4:
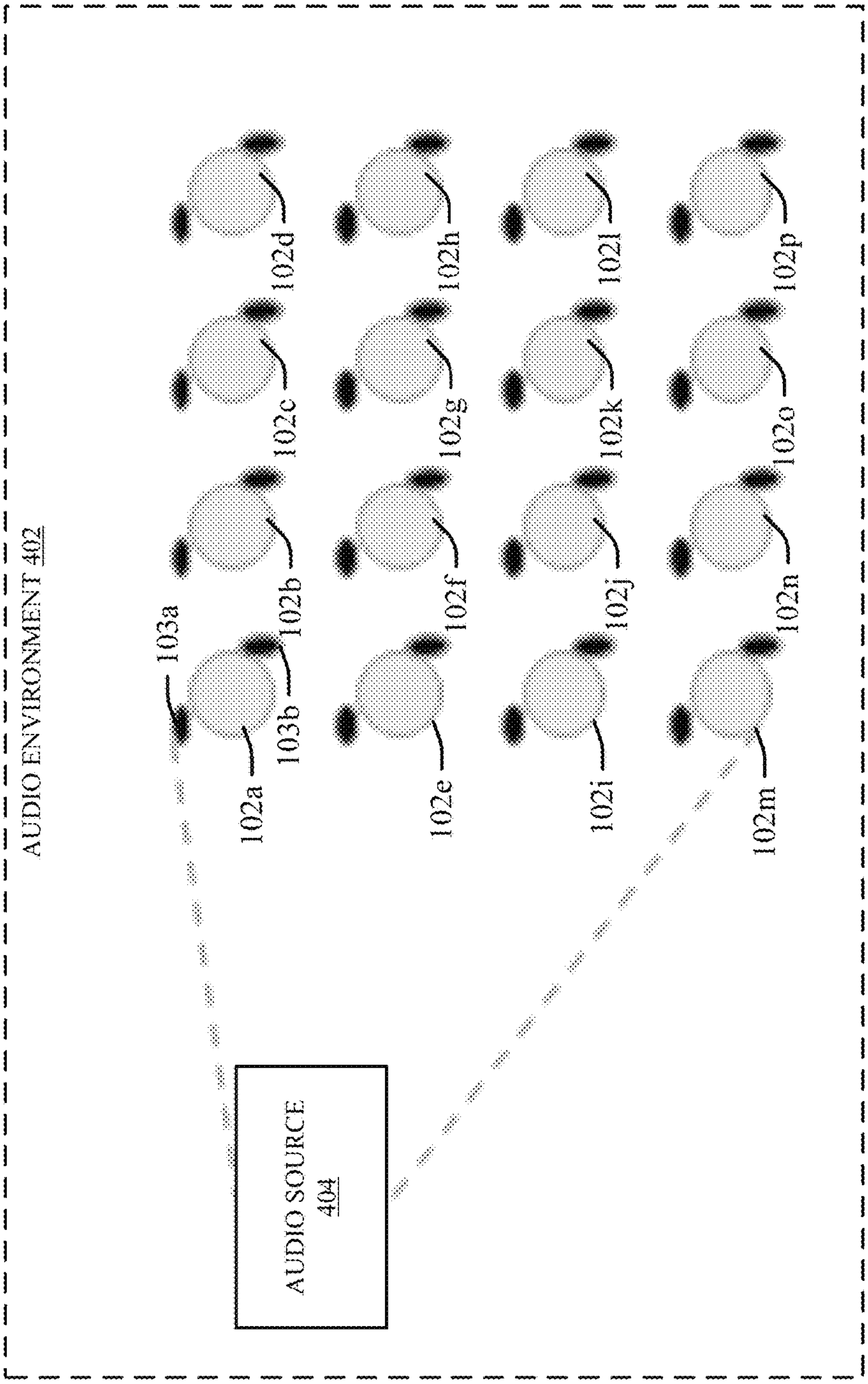
Figure 5:
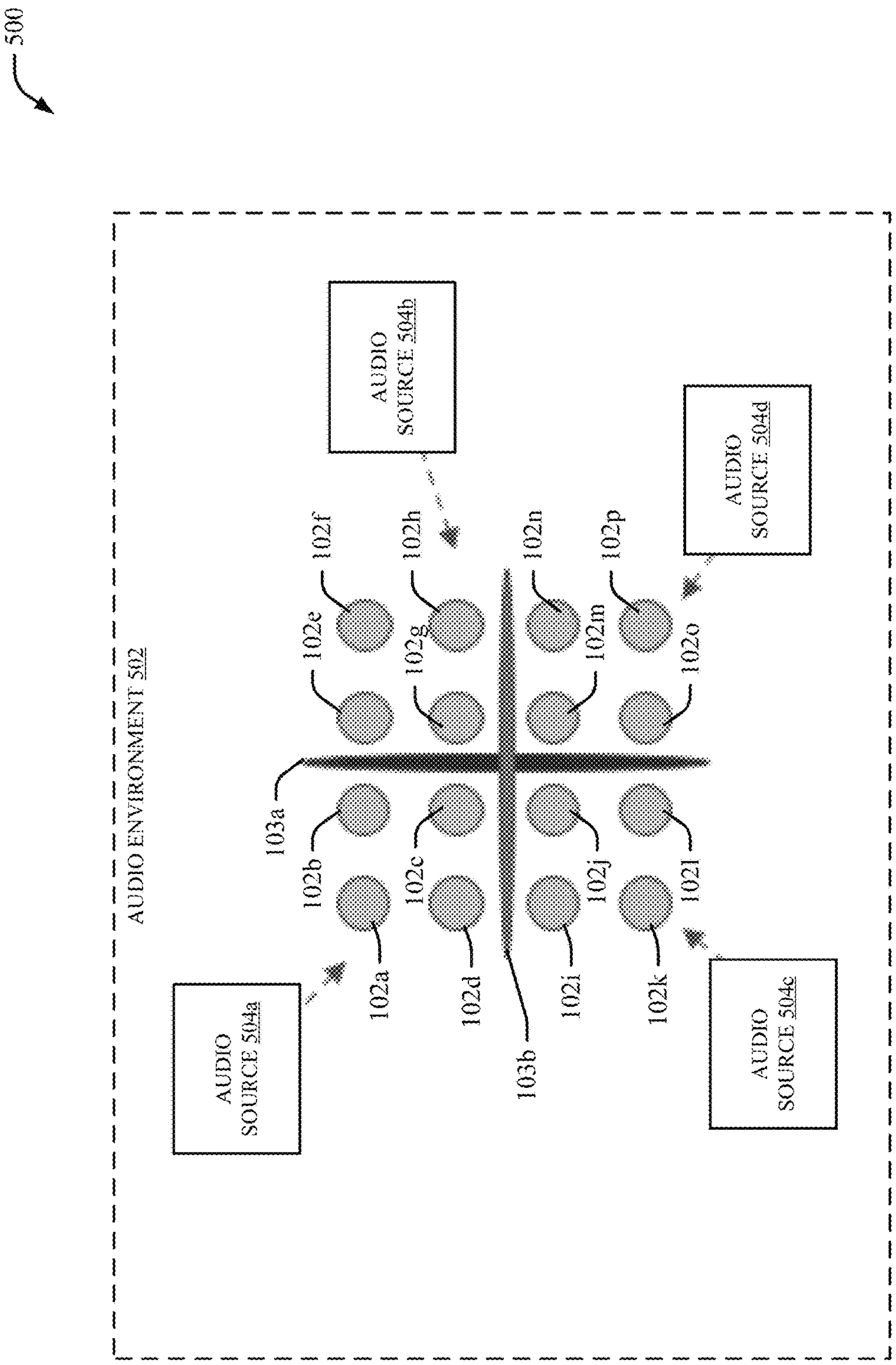
Figure 6:
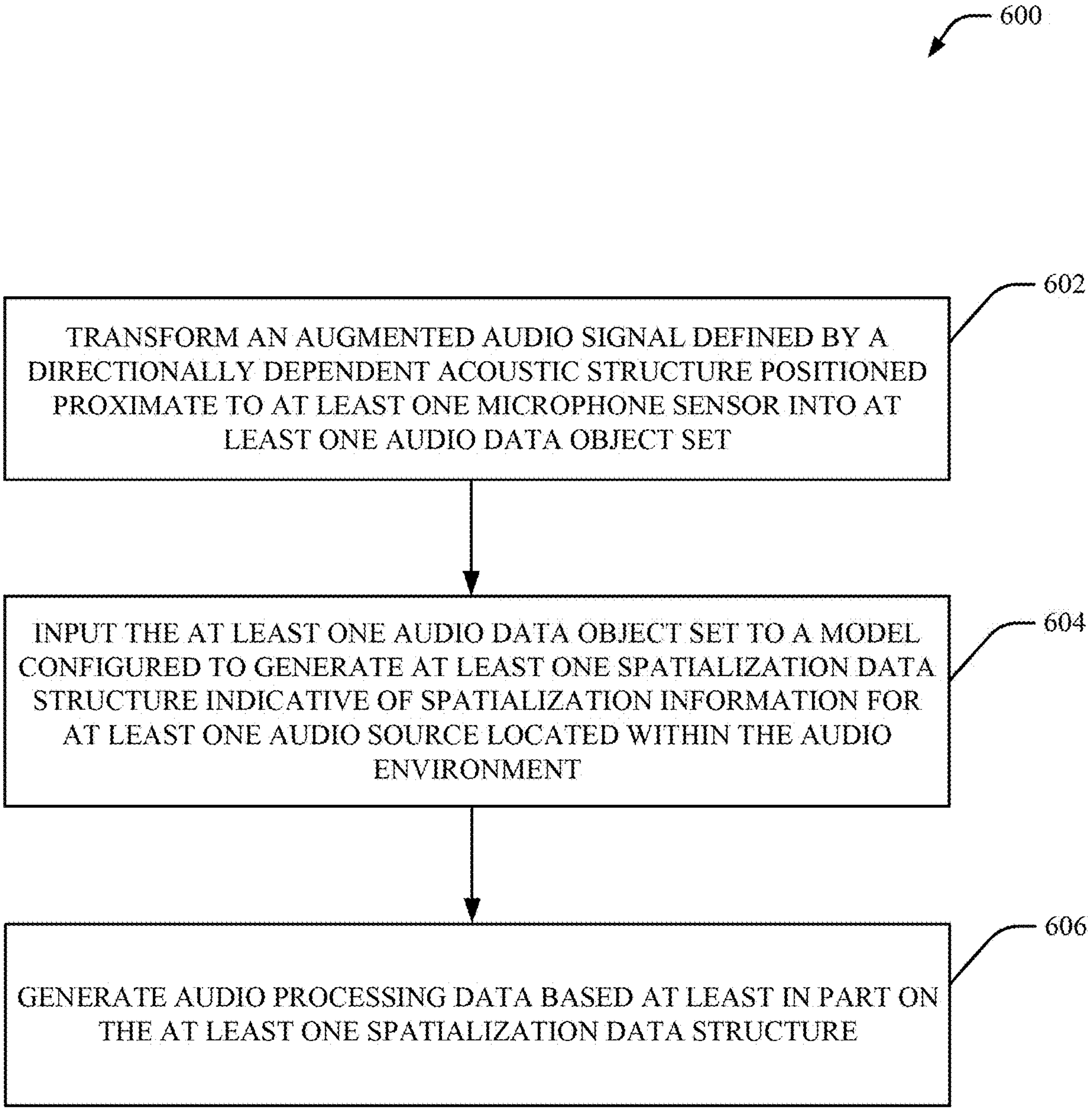

Having thus described some examples in general terms, reference will now be made to the accompanying drawings, which are not necessarily drawn to scale, and wherein:

FIG. 1 illustrates an example audio signal processing apparatus that comprises one or more microphone sensors, one or more directionally dependent acoustic structures, augmented audio signal processing circuitry, and a model in accordance with one or more embodiments disclosed herein;

FIG. 2 illustrates an example augmented audio signal processing circuitry configured in accordance with one or more embodiments disclosed herein;

FIG. 3 illustrates an example system for processing an audio signal for employment by a model in accordance with one or more embodiments disclosed herein;

FIG. 4 illustrates an example audio environment in accordance with one or more embodiments disclosed herein;

FIG. 5 illustrates another example audio environment in accordance with one or more embodiments disclosed herein; and FIG. 6 illustrates an example method for processing an audio signal originating from an audio environment in accordance with one or more embodiments disclosed herein.

DETAILED DESCRIPTION

Various embodiments of the present disclosure will now be described more fully hereinafter with reference to the accompanying drawings, in which some, but not all embodiments of the present disclosure are shown. Indeed, the disclosure may be embodied in many different forms and should not be construed as limited to the embodiments set forth herein. Rather, these embodiments are provided so that this disclosure will satisfy applicable legal requirements.

Overview

A typical audio system for capturing audio within an audio environment may contain a microphone array, a beamforming module, and/or other digital signal processing (DSP) elements. For example, a beamforming module may be configured to combine microphone signals captured by a microphone array using one or more DSP processing techniques. Typically, beamforming lobes of a microphone array may be directed to capture audio at fixed locations within an audio environment. However, traditional beamforming techniques often involve numerous microphone elements, expensive hardware, and/or manual setup for beam steering or microphone placement in an audio environment. Additionally, it is generally desirable to improve audio processing related to a source of audio captured by an array of microphones within an audio environment. For example, it is generally desirable to improve localization, isolation, and/or spatialization related to a source of audio captured by an array of microphones within an audio environment. For certain beamforming implementations, it may also be desirable to achieve a certain level of localization, isolation, and/or spatialization with a fewer amount of microphone elements as compared to a traditional microphone array.

Because certain types of audio sources such as a human talker in an audio environment may dynamically change location within the audio environment, beamforming lobes of a microphone array are often re-steered to attempt to capture the dynamic audio source. Re-steering to a particular location in an audio environment such as a room typically requires utilization of a greater number of microphone elements in a microphone array than a microphone array with beamforming lobes that do not undergo re-steering. Additionally, the re-steering of beamforming lobes of a microphone array often results in inefficient usage of computing resources, inefficient data bandwidth, and/or undesirable audio delay by an audio system. Moreover, re-steering beamforming lobes of a microphone array may not adequately capture each audio source in the audio environment, resulting in non-audio capture areas in an audio environment.

To address these and/or other technical problems associated with traditional audio systems, various embodiments disclosed herein provide a directionally dependent acoustic structure for audio processing related to at least one microphone sensor. The audio processing as disclosed herein may include modeling with respect to augmented audio signals captured via the at least one microphone sensor and the directionally dependent acoustic structure. The directionally dependent acoustic structure may be a three-dimensional structure with a defined geometry and/or material to augment audio signals based on a transfer function associated with the defined geometry and/or material of the directionally dependent acoustic structure. The directionally dependent acoustic structure may be configured as a directionally dependent acoustic baffle, a directionally dependent acoustic wedge, an artificial pinna structure, or another type of directionally dependent acoustic structure with a defined geometry and/or material.

Exemplary Apparatuses, Systems and Methods Related to a Directionally Dependent Acoustic Structure for Audio Processing FIG. 1 illustrates an audio signal processing apparatus 100 that is configured to provide audio processing related to a directionally dependent acoustic structure and one or more related microphone sensors according to one or more embodiments of the present disclosure. The audio signal processing apparatus 100 may correspond to or be integrated within a conferencing system (e.g., a conference audio system, a video conferencing system, a digital conference system, etc.), an audio performance system, an audio recording system, a music performance system, a music recording system, a digital audio workstation, a lecture hall microphone systems, a broadcasting microphone system, an augmented reality system, a virtual reality system, an online gaming system, or another type of audio system. Additionally, the audio signal processing apparatus 100 may be implemented as an apparatus and/or as software that is configured for execution on a smartphone, a laptop, a personal computer, a digital conference system, a wireless conference unit, an audio workstation device, an augmented reality device, a virtual reality device, a recording device, headphones, earphones, speakers, or another device.

In some examples, audio processing provided by the audio signal processing apparatus 100 may include modeling with respect to augmented audio signals captured via the at least one microphone sensor and the directionally dependent acoustic structure. The directionally dependent acoustic structure may be a three-dimensional structure with a defined geometry and/or material to augment audio signals based on a transfer function associated with the defined geometry and/or material of the directionally dependent acoustic structure. In some examples, the directionally dependent acoustic structure may be configured as a directionally dependent acoustic baffle, a directionally dependent acoustic wedge, an artificial pinna structure, or another type of directionally dependent acoustic structure with a defined geometry and/or material.

In some examples, the audio signal processing apparatus 100 may provide modeling with respect to augmented audio signals captured via the at least one microphone sensor and the directionally dependent acoustic structure. In some examples, the modeling may include digital signal processing modeling, machine learning modeling, and/or artificial intelligence modeling that is configured or trained to process audio that has been augmented by the directionally dependent acoustic structure. The modeling may be utilized to provide improved localization, isolation, and/or spatialization related to an audio source of the augmented audio signals. The modeling may additionally or alternatively be utilized to estimate size, shape, and/or orientation of an audio environment with respect to the audio source of the augmented audio signals. An improved output audio signal may additionally or alternatively be provided via the modeling.

In some examples, digital signal processing modeling, machine learning modeling, and/or artificial intelligence modeling provided by the audio signal processing apparatus 100 may be utilized to optimize sensitivity of localization, isolation, and/or spatialization associated with the directionally dependent acoustic structure. In some examples, digital signal processing modeling, machine learning modeling, and/or artificial intelligence modeling provided by the audio signal processing apparatus 100 may be utilized to restore an audio response of an audio signal to an unobstructed acoustic response such that improved localization, isolation, and/or spatialization is obtained. In some examples, restoring an audio response of an audio signal to an unobstructed acoustic response may improve a listening experience for a user via an audio output device. In some examples, restoring an audio response of an audio signal to an unobstructed acoustic response may be utilized to improve one or more subsequent transfer algorithms (e.g., a head-related transfer function algorithm, etc.) in an audio processing pipeline.

The audio signal processing apparatus 100 may provide improved localization, isolation, and/or spatialization for microphone signals augmented by one or more directionally dependent acoustic structures. In some examples, improved localization, isolation, and/or spatialization may be obtained in parallel to or approximately in parallel to transduction of audio by at least one microphone sensor. The audio signal processing apparatus 100 may additionally or alternatively provide improved audio quality for microphone signals augmented by one or more directionally dependent acoustic structures. The microphone signals may be captured via one or more microphone sensors within an audio environment. The one or more directionally dependent acoustic structures may be proximate or attached to the one or more microphone sensors. An audio environment may be an indoor environment, an outdoor environment, a room, a performance hall, a broadcasting environment, a virtual environment, or another type of audio environment. In various examples, the audio signal processing apparatus 100 may additionally or alternatively be configured to provide noise reduction, noise cancellation, denoising, dereverberation, and/or other filtering of undesirable sound with respect to microphone signals via audio signal modeling. The audio signal modeling may be provided via digital signal processing modeling, machine learning modeling, and/or artificial intelligence modeling that is configured or trained to process the microphone signals augmented by one or more directionally dependent acoustic structures.

In some examples, the audio signal processing apparatus 100 may remove noise from speech-based microphone signals captured via the one or more microphone sensors located within the audio environment. For example, the audio signal processing apparatus 100 may be incorporated into microphone hardware for use when a microphone is in a "speech" mode. Additionally, in some examples, the audio signal processing apparatus 100 may remove noise, reverberation, and/or other audio artifacts from non-speech microphone signals such as music, precise audio analysis applications, public safety tools, sporting event audio, or other non-speech audio.

The audio signal processing apparatus 100 may include one or more microphone sensors 102*a-n* and augmented audio signal processing circuitry 104. The one or more microphone sensors 102*a-n* may correspond to or be integrated within a microphone. A microphone may include, but is not limited to, an array microphone, one or more beamformed lobes of an array microphone, a condenser microphone, a micro-electromechanical systems (MEMS) microphone, a dynamic microphone, a piezoelectric microphone, a linear array microphone, a ceiling array microphone, a table array microphone, a virtual microphone, a network microphone, a ribbon microphone, or another type of microphone configured to capture audio. In certain examples, the one or more microphone sensors 102*a-n* may be one or more other types of sensors for a device such as, but not limited to, a sensor device, a video capture device, an infrared capture device, and/or another type of audio capture device. Additionally or alternatively, the one or more microphone sensors 102*a-n* may be included in a combination of microphones, video capture devices, infrared capture devices, sensor devices, and/or another type of audio capture device.

The one or more microphone sensors 102*a-n* may be respectively configured for capturing an audio signal 106 by converting audio into one or more electrical signals. The audio signal 106 captured by the one or more microphone sensors 102*a-n* may be augmented via at least one directionally dependent acoustic structure 103 to provide an augmented audio signal 107. The one or more microphone sensors 102*a-n* and the directionally dependent acoustic structure 103 may be positioned within an audio environment. In a non-limiting example, the one or more microphone sensors 102*a-n* may be sixteen microphones configured in a fixed geometry. In another non-limiting example, the one or more microphone sensors 102*a-n* may be eight microphones configured in a fixed geometry (e.g., seven microphones configured along a circumference of a circle and one microphone in the center of the circle). However, it is to be appreciated that, in certain examples, the one or more microphone sensors 102*a-n* may be configured in a different manner within an audio environment.

In some examples, the one or more microphone sensors 102*a-n* are configured as a microphone array. In some examples, at least one other microphone sensor in the microphone array is positioned at least proximate to a directionally dependent acoustic structure configured to augment audio with different transfer function data than a directionally dependent acoustic structure associated with the microphone array. In some examples, the microphone array includes a linear array, a planar array, or a 3D array. Alternatively, in some examples, at least one other microphone sensor in the microphone array is separated from the at least one microphone sensor by a directionally dependent acoustic structure and/or is configured to augment audio with different transfer function data than the directionally dependent acoustic structure.

The directionally dependent acoustic structure 103 may be a three-dimensional structure with a defined geometry and/or material to augment the audio signal 106 based on a transfer function associated with the defined geometry and/or material of the directionally dependent acoustic structure 103. The defined geometry and/or material of the directionally dependent acoustic structure 103 may provide a particular acoustic response. The directionally dependent acoustic structure 103 may be configured as a directionally dependent acoustic baffle, a directionally dependent acoustic wedge, an artificial pinna structure, a mesh structure, or another type of directionally dependent acoustic structure with a defined geometry and/or material. The material of the directionally dependent acoustic structure 103 may include a plastic, a metal, a composite, a metamaterial, a cloth material, and/or another type of material. The material of the directionally dependent acoustic structure 103 may also provide a particular degree of audio absorption and/or radio frequency conductivity. In some examples, the directionally dependent acoustic structure 103 may comprise a spatially asymmetric shape to provide a particular transfer function. Additionally, a size of the directionally dependent acoustic structure 103 may correspond to a common size of an anatomical structure found in a human ear. Additionally or alternatively, a distance between the directionally dependent acoustic structure 103 and the one or more microphone sensors 102*a-n* may correspond to a common distance between anatomical structures found in a human ear.

In some examples, the defined geometry of the directionally dependent acoustic structure 103 may include characteristics similar to human ear components. The characteristics may be related to: a helix structure representative of an outer-most structure of an outer ear with a 3D curved and tapered shape, a fossa structure representative of undulating ridges and depressions in an outer ear, an antihelix structure representative of undulating ridges and depressions in an outer ear, an antitragus structure representative of undulating ridges and depressions in an outer ear, a tragus structure representative of a shape located proximate to a middle ear, a concha structure representative of a shapes located proximate to a middle ear), and/or another human ear structure.

The directionally dependent acoustic structure 103 may be implemented as one or more directionally dependent acoustic structures for each microphone sensor of the one or more microphone sensors 102*a-n*. For example, one or more directionally dependent acoustic structures may be proximate or attached to each microphone sensor of the one or more microphone sensors 102*a-n*. Alternatively, the directionally dependent acoustic structure 103 may be implemented as one or more directionally dependent acoustic structure arranged proximate to the one or more microphone sensors 102*a-n*. In some examples, the directionally dependent acoustic structure 103 may be attached to or integrated with a substrate, a printed circuit board, a grill cover for a microphone, or another type of physical structure associated with the one or more microphone sensors 102*a-n*. The directionally dependent acoustic structure 103 may be fixed or removable with respect to substrate, a printed circuit board, a grill cover for a microphone, or another type of physical structure associated with the one or more microphone sensors 102*a-n*.

In some examples, the directionally dependent acoustic structure 103 may be implemented as a two axis baffle where each axis of the baffle correspond to an extrusion from a microphone plane with a different acoustic response (e.g., two different heights of extrusion) such that, in any given quadrant of a microphone array, the transfer function of from the direction of any other quadrant is unique due to the combinations of the baffles to be traversed into order to arrive at the given quadrant. Additionally, shifting an acoustic origination point of the microphone array from a geometric center of the entire structure to multiple geometric centers of each quadrant may provide for differential comparison of the acoustic responses to further enhance localization, isolation, and/or or spatialization.

The augmented audio signal 107 may be configured as an electrical signal. In certain examples, the augmented audio signal 107 may be configured as a digital audio streams. In certain examples, the augmented audio signal 107 may be configured as a radio frequency signal. The augmented audio signal 107 may be provided as input to the augmented audio signal processing circuitry 104. The augmented audio signal 107 may utilize a model 110 to convert the augmented audio signal 107 into audio processing data 108.

The audio processing data 108 may be an output audio signal for the augmented audio signal 107. Additionally or alternatively, the audio processing data 108 may include spatial information for the audio environment to steer microphone beams of the one or more microphone sensors 102*a-n*, to perform tuning (e.g., digital signal processing tuning) of the one or more microphone sensors 102*a-n*, to provide analytics related to the one or more microphone sensors 102*a-n*, to provide the spatial information to a third-party system (e.g., a video camera system, a virtual reality system, etc.), and/or to perform one or more other types of audio processing. Additionally or alternatively, the audio processing data 108 may include spatial information for the audio environment to dynamically configure and/or alter the directionally dependent acoustic structure 103. For example, orientation (e.g., rotating and/or shape shifting), stiffness, acoustic damping characteristics, and/or one or more other characteristics of the directionally dependent acoustic structure 103 may be altered based on the spatial information. In some examples, spatially dependent transfer function characteristics may be removed from the audio processing data 108.

In some examples, the spatial information may be utilized to augment one or more digital signal processing pipelines associated with the one or more microphone sensors 102*a-n*. In some examples, the spatial information may be utilized to adjust gain or a physical orientation of the one or more microphone sensors 102*a-n*. In some examples, the spatial information may direct a beamforming lobe to a particular location in an audio environment. In some examples, the spatial information may predict one or more audio characteristics related to the audio signal 106. In some examples, the spatial information may include a set of predicted 3D locations or regions associated with one or more audio sources. In some examples, the spatial information may include a sound classification, a predicted dimension or other characteristic of an audio environment associated with the audio signal 106, a predicted orientation of an audio source device associated with the audio signal 106, and/or other information associated with the audio signal 106 or audio environment.

To facilitate generation of the audio processing data 108, the augmented audio signal processing circuitry 104 may transform the augmented audio signal 107 into at least one audio data object set. The at least one audio data object set may represent physical features and/or perceptual features related to the augmented audio signal 107. For instance, an audio feature set may comprise: one or more: transfer function features, delay of arrival features, timbre features, audio spectrum features, magnitude features, phase features, pitch features, harmonic features, Mel-frequency cepstral coefficients (MFCC) features, audio separation modeling features, time-domain audio separation network (TasNet) features, performance features, performance sequencer features, tempo features, time signature features, mask features, and/or other types of features associated with the augmented audio signal 107. The at least one audio data object set may additionally or alternatively represent predicted features of an audio environment related to the audio signal 106. For instance, an audio feature set may additionally or alternatively comprise: geometry features of the audio environment, orientation features of the one or more microphone sensors 102*a-n* within the audio environment, impulse response features of the audio environment, ambient pressure features of the audio environment, ambient temperature features of the audio environment, 3D features of the audio environment, 3D coordinates for different locations within the audio environment, and/or other types of features associated with the audio environment.

The transfer function features may represent perceptual features of the augmented audio signal 107 such as transfer function characteristics related the augmented audio signal 107. The delay of arrival features may represent perceptual features of the augmented audio signal 107 such as latency characteristics related the augmented audio signal 107. The timbre features may represent perceptual features of the augmented audio signal 107 such as tone quality characteristics related the augmented audio signal 107.

The magnitude features may represent physical features of the augmented audio signal 107 such as magnitude measurements with respect to the augmented audio signal 107. The phase features may represent physical features of the augmented audio signal 107 such as phase measurements with respect to the augmented audio signal 107. The pitch features may represent perceptual features of the augmented audio signal 107 such as frequency characteristics related to the augmented audio signal 107. The harmonic features may represent perceptual features of the augmented audio signal 107 such as frequency characteristics related to harmonics for the augmented audio signal 107.

The MFCC features may represent physical features of the augmented audio signal 107 such as MFCC measurements with respect to the augmented audio signal 107. The MFCC measurements may be extracted based on windowing operations, digital transformations, and/or warping of frequencies on a Mel frequency scale with respect to the augmented audio signal 107.

The performance features may represent perceptual features of the augmented audio signal 107 such as audio characteristics related to performance of the augmented audio signal 107. In various examples, the performance features may be obtained via one or more audio analyzers that analyze performance of the augmented audio signal 107. The performance sequencer features may represent perceptual features of the augmented audio signal 107 such as audio characteristics related to performance of the augmented audio signal 107 as determined by one or more audio sequencers that analyze characteristics of the augmented audio signal 107.

The tempo features may represent perceptual features of the augmented audio signal 107 such as beats per minute characteristics related to tempo for the augmented audio signal 107. The time signature features may represent perceptual features of the augmented audio signal 107 such as beats per musical measure characteristics related to a time signature for the augmented audio signal 107.

The at least one audio data object set may be provided as input to the model 110. In some examples, an orientation of the one or more microphone sensors 102*a-n*, data from one or more other sensors, one or more previously determined audio predictions (e.g., one or more previously determined spatialization data structures), and/or other data may be provided as input to the model 110. The model 110 may be configured to generate at least one spatialization data structure. Based on the at least one spatialization data structure, the augmented audio signal processing circuitry 104 may generate the audio processing data 108. A spatialization data structure may include spatialization information for at least one audio source located within the audio environment. Spatialization information included in spatialization data structure may comprise: one or more: two-dimensional (2D) polar coordinates, three-dimensional (3D) coordinates, audio channel features, audio balance features, audio directionality features, frequency response features, and/or other spatialization information.

In some examples, the spatialization data structure may additionally or alternatively include localization data for at least one audio source in the audio environment. For example, the localization information may comprise: location information, two-dimensional (2D) polar coordinates, three-dimensional (3D) coordinates, localized audio signal representations (e.g., waveforms, spectrograms, audio components, etc.), Vector Symbolic Architecture (VSA) encodings, a classification for a sound associated with at least one audio source in the audio environment. In some examples, a classification for a sound may include an audio class (e.g., a first type of audio source or a second type of audio source), a speech class (e.g., a first type of user class or a second type of user class), an equalization class (e.g., a low frequency class, a middle frequency class, a high frequency class, etc.), and/or another type of classification for at least one audio source in the audio environment.

In some examples, the spatialization data structure may additionally or alternatively include isolated audio data for at least one audio source in the audio environment. In some examples, the isolated audio data may include high-fidelity audio with suppressed or minimal noise and/or other audio enhancements determined based on predicted location, classification, and/or localized source waveforms. In some examples, the isolated audio data may be configured as an object-based audio sample associated with an audio coding standard. For example, the isolated audio data may include one or more encoded audio signals. In some examples, the isolated audio data may be encoded in a 3D audio format (e.g., MPEG-H, a 3D audio format related to ISO/IEC 23008-3, another type of 3D audio format, etc.).

In some examples, the isolated audio data may be configured for one or more receivers associated with a teleconferencing system, a video conferencing system, a virtual reality system, an online gaming system, a metaverse system, a recording system, and/or another type of system. In some examples, the one or more receivers may be one or more far-end receivers configured for real-time spatial scene reconstruction. Additionally, the one or more receivers may be one or more codecs configured for teleconferencing (e.g., 2D teleconferencing or 3D teleconferencing), videoconferencing (e.g., 2D videoconferencing or 3D videoconferencing), one or more virtual reality applications, one or more online gaming applications, one or more recording applications, and/or one or more other types of codecs. In some examples, a recording device of a recording system may be configured for playback based on the 3D audio format. A recording device of a recording system may additionally or alternatively be configured for playback associated with teleconferencing (e.g., 2D teleconferencing or 3D teleconferencing), videoconferencing (e.g., 2D videoconferencing or 3D videoconferencing), virtual reality, online gaming, a metaverse, and/or another type of audio application.

In some examples, the audio processing data 108 may be an improved audio stream with reduced noise, reverberation, and/or other undesirable audio artifacts with respect to the audio stream inputs 106*a-n*. In some examples, the audio processing data 108 may be an encoded audio signal. For example, the audio processing data 108 may be encoded in a 3D audio format (e.g., MPEG-H, a 3D audio format related to ISO/IEC 23008-3, another type of 3D audio format, etc.). Alternatively, the audio processing data 108 may be encoded in another spatialized audio format (e.g., a binaural format). In some examples, the audio processing data 108 may be encoded in a stereo encoding format, a HiFi encoding format (e.g., 5.1 HiFi, 7.1 HiFi, etc.), an ambisonic encoding format (e.g., ambisonic channels, B-Format, etc.) a binaural encoding format (e.g., a stereo binaural encoding), and/or another type of encoding format. In some examples, a defined head-related transfer function (HRTF) or a personalized HRTF may be utilized for encoding of the audio processing data 108. In some examples, metadata and/or channelized objects associated with the audio signal 106 may additionally or alternatively be utilized for encoding of the audio processing data 108. The audio processing data 108 may additionally or alternatively be configured for reconstruction by one or more receivers. For example, the audio processing data 108 may be configured for one or more receivers associated with a teleconferencing system, a video conferencing system, a virtual reality system, an augmented reality system, an online gaming system, a metaverse system, a recording system, and/or another type of system. In certain examples, the one or more receivers may be one or more far-end receivers configured for real-time spatial scene reconstruction. Additionally, the one or more receivers may be one or more codecs configured for teleconferencing (e.g., 2D teleconferencing or 3D teleconferencing), videoconferencing (e.g., 2D videoconferencing or 3D videoconferencing), one or more virtual reality applications, one or more augmented reality applications, one or more online gaming applications, one or more recording applications, and/or one or more other types of codecs. In some examples, a recording device of a recording system may be configured for playback based on the 3D audio format. A recording device of a recording system may additionally or alternatively be configured for playback associated with teleconferencing (e.g., 2D teleconferencing or 3D teleconferencing), videoconferencing (e.g., 2D videoconferencing or 3D videoconferencing), virtual reality, augmented reality, online gaming, a metaverse, and/or another type of audio application.

In some examples, the audio processing data 108 may be correlated to a zone of the audio environment and/or to a Voronoi map associated with the audio environment. The Voronoi map may include size information and/or location information for the audio environment to facilitate portioning the audio environment into respective zones. In certain examples, the audio processing data 108 may be further utilized by a classifier model for sound identification and/or other audio classification related to the audio environment. In certain examples, the audio processing data 108 may be correlated to 3D regions and/or maps associated with an audio environment. In certain examples, the audio processing data 108 may be correlated to point clouds, 3D meshes, 3D geometries, and/or other data associated with a 3D model of an audio environment.

In certain examples, the audio processing data 108 may be an improved audio signal with reduced noise, reverberation, and/or other undesirable audio artifacts with respect to the audio signal. For example, the audio processing data 108 may maintain desired audio (e.g., voice audio) from the audio signal 106 while also providing denoising, noise reduction, noise cancellation, dereverberation, and/or other audio enhancement. The audio processing data 108 may additionally or alternatively provide the desired audio (e.g., related to each voice audio source in an audio environment) with improved audio quality such as, for example, with higher bandwidth, less reverberance, improved audio magnitude, improved audio pitch, etc. as compared to the audio signal 106. In examples, the audio processing data 108 may maintain desired audio quality for the audio signal 106 while removing the effect of the transfer function augmentation related to the augmented audio signal 107. For example, the augmented audio signal processing circuitry 104 may remove transfer function data from the augmented audio signal 107 to generate an output audio signal. As such, the output audio signal may be configured without the transfer function data. Additionally, in some examples, the output audio signal may be an improved version of the audio signal

106 such that the output audio signal includes improved audio characteristics (e.g., reduced noise, reduced reverberation, and/or removal of undesirable audio artifacts) as compared to the audio signal 106. The transfer function data may be associated with a transfer function of the directionally dependent acoustic structure 103 that is utilized to augment the audio signal 106. In some examples, the transfer function data may include directionally-dependent transfer function data associated with the directionally dependent acoustic structure 103.

Moreover, the augmented audio signal processing circuitry 104 may employ fewer computing resources when compared to traditional audio processing systems that are used for digital signal processing. Additionally or alternatively, the augmented audio signal processing circuitry 104 may be configured to deploy fewer memory resources allocated to spatialization, localization, isolation, denoising, dereverberation, and/or other audio filtering for an audio signal sample such as, for example, the audio signal 106. In still other examples, the augmented audio signal processing circuitry 104 may be configured to improve processing speed of spatialization operations, localization operations, isolation operations, denoising operations, dereverberation operations, and/or audio filtering operations. The augmented audio signal processing circuitry 104 may also be configured to reduce a number of computational resources associated with applying models such as, for example, the model 110, to the task of spatialization, localization, isolation, denoising, dereverberation, and/or other audio filtering. These improvements may enable an improved audio processing system to be deployed in microphones or other hardware/software configurations where processing and memory resources are limited, and/or where processing speed and efficiency is important.

FIG. 2 illustrates an example augmented audio signal processing circuitry 104 configured in accordance with one or more embodiments of the present disclosure. The augmented audio signal processing circuitry 104 may be configured to perform one or more techniques described in FIG. 1 and/or one or more other techniques described herein.

In some examples, the augmented audio signal processing circuitry 104 may be a computing system communicatively coupled with, and configured to control, one or more circuit modules associated with wireless audio processing. For example, the augmented audio signal processing circuitry 104 may be a computing system communicatively coupled with one or more circuit modules related to wireless audio processing. The augmented audio signal processing circuitry 104 may comprise or otherwise be in communication with a processor 204, a memory 206, audio signal modeling circuitry 208, audio processing circuitry 210, input/output circuitry 212, and/or communications circuitry 214. In some examples, the processor 204 (which may comprise multiple or co-processors or any other processing circuitry associated with the processor) may be in communication with the memory 206.

The memory 206 may comprise non-transitory memory circuitry and may comprise one or more volatile and/or non-volatile memories. In some examples, the memory 206 may be an electronic storage device (e.g., a computer readable storage medium) configured to store data that may be retrievable by the processor 204. In some examples, the data stored in the memory 206 may comprise radio frequency signal data, audio data, stereo audio signal data, mono audio signal data, or the like, for enabling the apparatus to carry out various functions or methods in accordance with examples of the present invention, described herein.

In some examples, the processor 204 may be embodied in a number of different ways. For example, the processor 204 may be embodied as one or more of various hardware processing means such as a central processing unit (CPU), a microprocessor, a coprocessor, a DSP, an Advanced RISC Machine (ARM), a field programmable gate array (FPGA), a neural processing unit (NPU), a graphics processing unit (GPU), a system on chip (SoC), a cloud server processing element, a controller, or a processing element with or without an accompanying DSP. The processor 204 may also be embodied in various other processing circuitry including integrated circuits such as, for example, a microcontroller unit (MCU), an ASIC (application specific integrated circuit), a hardware accelerator, a cloud computing chip, or a special-purpose electronic chip. Furthermore, in some examples, the processor 204 may comprise one or more processing cores configured to perform independently. A multi-core processor may enable multiprocessing within a single physical package. Additionally or alternatively, the processor 204 may comprise one or more processors configured in tandem via the bus to enable independent execution of instructions, pipelining, and/or multithreading.

In some examples, the processor 204 may be configured to execute instructions, such as computer program code or instructions, stored in the memory 206 or otherwise accessible to the processor 204. Alternatively or additionally, the processor 204 may be configured to execute hard-coded functionality. As such, whether configured by hardware or software instructions, or by a combination thereof, the processor 204 may represent a computing entity (e.g., physically embodied in circuitry) configured to perform operations according to an example of the present invention described herein. For example, when the processor 204 is embodied as an CPU, DSP, ARM, FPGA, ASIC, or similar, the processor may be configured as hardware for conducting the operations of an embodiment of the invention. Alternatively, when the processor 204 is embodied to execute software or computer program instructions, the instructions may specifically configure the processor 204 to perform the algorithms and/or operations described herein when the instructions are executed. However, in some examples, the processor 204 may be a processor of a device specifically configured to employ an embodiment of the present invention by further configuration of the processor using instructions for performing the algorithms and/or operations described herein. The processor 204 may further comprise a clock, an arithmetic logic unit (ALU) and logic gates configured to support operation of the processor 204, among other things.

In one or more examples, the augmented audio signal processing circuitry 104 may comprise the audio signal modeling circuitry 208. The audio signal modeling circuitry 208 may be any means embodied in either hardware or a combination of hardware and software that is configured to perform one or more functions disclosed herein related to the model 110. In one or more examples, the augmented audio signal processing circuitry 104 may comprise the audio processing circuitry 210. The audio processing circuitry 210 may be any means embodied in either hardware or a combination of hardware and software that is configured to perform one or more functions disclosed herein related to audio processing of the audio signal 106, the augmented audio signal 107, and/or audio processing related to generation of the audio processing data 108.

In some examples, the augmented audio signal processing circuitry 104 may comprise the input/output circuitry 212 that may, in turn, be in communication with processor 204 to provide output to the user and, in some examples, to receive an indication of a user input. The input/output circuitry 212 may comprise a user interface and may comprise a display. In some examples, the input/output circuitry 212 may also comprise a keyboard, a touch screen, touch areas, soft keys, buttons, knobs, or other input/output mechanisms.

In some examples, the augmented audio signal processing circuitry 104 may comprise the communications circuitry 214. The communications circuitry 214 may be any means embodied in either hardware or a combination of hardware and software that is configured to receive and/or transmit data from/to a network and/or any other device or module in communication with the augmented audio signal processing circuitry 104. In this regard, the communications circuitry 214 may comprise, for example, an antennae or one or more other communication devices for enabling communications with a wired or wireless communication network. For example, the communications circuitry 214 may comprise antennae, one or more network interface cards, buses, switches, routers, modems, and supporting hardware and/or software, or any other device suitable for enabling communications via a network. Additionally or alternatively, the communications circuitry 214 may comprise the circuitry for interacting with the antenna/antennae to cause transmission of signals via the antenna/antennae or to handle receipt of signals received via the antenna/antennae.

FIG. 3 illustrates a system 300 for processing an audio signal for employment by a model according to one or more embodiments of the present disclosure. The system 300 comprises a digital transformation module 302 and the model 110. The digital transformation module 302 may be executed by the audio signal modeling circuitry 208 and/or another portion of the augmented audio signal processing circuitry 104.

The digital transformation module 302 may receive the augmented audio signal 107. Additionally, the digital transformation module 302 may be configured to perform one or more digital transformations with respect to the augmented audio signal 107 to generate an audio data object set 303 for employment by the model 110.

The audio data object set 303 may comprise digitized data related to the augmented audio signal. For example, the audio data object set 303 may comprise a digital representation of the augmented audio signal 107. The digitized data may include, for example, a spectrogram representation of the augmented audio signal 107, a Mel spectrogram representation of the augmented audio signal 107, a wavelet audio representation of the augmented audio signal 107, a short-term Fourier transform (STFT) representation of the augmented audio signal 107, a time-domain representation of the augmented audio signal 107, a Bark scale representation of the augmented audio signal 107, an Equivalent Rectangular Bandwidth (ERB) representation of the augmented audio signal 107, a TasNet representation of the augmented audio signal 107, or another type of audio transformation representation of the augmented audio signal 107. The audio data object set 303 may be provided as input to the model 110.

Based on machine learning, artificial intelligence, and/or DSP processing with respect to the audio data object set 303, the model 110 may generate one or more spatialization data structure 304. The one or more spatialization data structure 304 may respectively include spatialization information for at least one audio source located within the audio environment. Spatialization information included in the one or more spatialization data structure 304 may comprise: one or more: 2D polar coordinates, 3D coordinates, audio channel features, audio balance features, audio directionality features, frequency response features, and/or other spatialization information. In an example, the one or more spatialization data structure 304 may be configured as respective filter mask data structures (e.g., respective filter kernel data structures) associated with audio processing feature predictions, microphone sensor tuning predictions, and/or one or more other predictions. The respective filter mask data structures may correspond to a magnitude mask, a magnitude and phase mask, a complex coefficient mask, a time/frequency mask, or another type of mask.

To generate the one or more spatialization data structure 304, the model 110 may utilize a modeling rules set 305. The modeling rules set 305 may include transfer function rules, delay of arrival rules, timbre rules and/or one or more other rules. In some examples, the modeling rules set 305 may include modeling rules, parameters, and/or weights for the model 110.

FIG. 4 illustrates an example audio environment 402 according to one or more embodiments of the present disclosure. The audio environment 402 may be an indoor environment, an outdoor environment, a room, a performance hall, a broadcasting environment, a virtual environment, or another type of audio environment. The audio environment 402 includes an audio source 404 that provides audio such as, for example, the audio signal 106, to a set of microphone sensors 102*a-p*. The set of microphone sensors 102*a-p* may be an example configuration of the microphone sensors illustrated in FIG. 1. In various examples, the of microphone sensors 102*a-p* may be configured as a microphone array. In an example, a first directionally dependent acoustic structure 103*a* and a second directionally dependent acoustic structure 103*b* may be proximate or attached to a microphone sensor of the set of microphone sensors 102*a-p*. For example, a first directionally dependent acoustic structure 103*a* and a second directionally dependent acoustic structure 103*b* may be proximate or attached to the microphone sensor 102*a*, a first directionally dependent acoustic structure 103*a* and a second directionally dependent acoustic structure 103*b* may be proximate or attached to the microphone sensor 102*b*, etc. In some examples, the first directionally dependent acoustic structure 103*a* and the second directionally dependent acoustic structure 103*b* are three-dimensional structures configured to augment audio captured by a respective microphone sensor with transfer function data associated with the respective three-dimensional structure in order to provide an augmented audio signal such as, for example, the augmented audio signal 107.

In some examples, the set of microphone sensors 102*a-p* are configured as a microphone array. In some examples, at least one other microphone sensor in the microphone array is positioned at least proximate to a different directionally dependent acoustic structure configured to augment audio with different transfer function data than the directionally dependent acoustic structure. In some examples, the microphone array includes a linear array, a planar array, or a 3D array. Alternatively, in some examples, at least one other microphone sensor in the microphone array is separated from the at least one microphone sensor by the directionally dependent acoustic structure and is configured to augment audio with different transfer function data than the directionally dependent acoustic structure.

In some examples, a number of directionally dependent acoustic structures 103 corresponds to a number of microphone sensors 102*a-n* utilized by the audio signal processing apparatus 100. In some examples, a number of directionally dependent acoustic structures 103 is less than a number of microphone sensors 102*a-n* utilized by the audio signal processing apparatus 100. In some examples, a number of directionally dependent acoustic structures 103 is greater than a number of microphone sensors 102*a-n* utilized by the audio signal processing apparatus 100.

FIG. 5 illustrates an example audio environment 502 according to one or more embodiments of the present disclosure. The audio environment 502 may be an indoor environment, an outdoor environment, a room, a performance hall, a broadcasting environment, a virtual environment, or another type of audio environment. The audio environment 502 includes an audio source 504*a* that provides audio such as, for example, the audio signal 106, to one or more microphone sensors from microphone sensors 102*a-p*. The audio environment 502 also includes an audio source 504*b* that provides audio such as, for example, the audio signal 106, to one or more microphone sensors from microphone sensors 102*a-p*. The audio environment 502 also includes an audio source 504*c* that provides audio such as, for example, the audio signal 106, to one or more microphone sensors from microphone sensors 102*a-p*. The audio environment 502 also includes an audio source 504*d* that provides audio such as, for example, the audio signal 106, to one or more microphone sensors from microphone sensors 102*a-p*. At least a portion of the set of microphone sensors 102*a-p* may be an example configuration of the microphone sensors illustrated in FIG. 1. In an example, microphone sensors 102*a-d*, microphone sensors 102*e-h*, microphone sensors 102*i-l*, and/or microphone sensors 102*m-p* may be an example configuration of the microphone sensors illustrated in FIG. 1. In various examples, the of microphone sensors 102*a-p* may be configured as a microphone array. Additionally, teach quadrant of the audio environment 502 may be associated with a unique transfer function for a respective audio source 504*a-d.*

A first directionally dependent acoustic structure 103*a* and a second directionally dependent acoustic structure 103*b* may be proximate or attached to the set of microphone sensors 102*a-p*. For example, the first directionally dependent acoustic structure 103*a* and the second directionally dependent acoustic structure 103*b* may divide the set of microphone sensors 102*a-p* into respective groups of microphone sensors including microphone sensors 102*a-d*, microphone sensors 102*e-h*, microphone sensors 102*i-l*, and microphone sensors 102*m-p*. Accordingly, the respective groups may experience a different timbre depending on the direction of the respective audio source. Additionally, the respective microphone sensors may receive the audio source with a different timber due to different sound experiences via different audio paths provided by the first directionally dependent acoustic structure 103*a* and the second directionally dependent acoustic structure 103*b*.

FIG. 6 is a flowchart diagram of an example process 600, for processing an audio signal originating from an audio environment, in accordance with, for example, an augmented audio signal processing circuitry 104 illustrated in FIG. 2. Via the various operations of the process 600, the augmented audio signal processing circuitry 104 may enhance spatialization, localization, and/or isolation of audio associated with an audio environment. Additionally or alternatively, via the various operations of the process 600, the augmented audio signal processing circuitry 104 may enhance quality and/or reliability of audio associated with an audio environment. The process 600 begins at operation 602 that transforms (e.g., by the audio signal modeling circuitry 208) transform an augmented audio signal defined by a directionally dependent acoustic structure positioned proximate to at least one microphone sensor into at least one audio data object set.

In some examples, the directionally dependent acoustic structure is a three-dimensional structure configured to augment audio captured by the at least one microphone sensor with transfer function data associated with the three-dimensional structure in order to provide the augmented audio signal. In some examples, the augmented audio signal is an augmented version of the audio signal based on a transfer function associated with the directionally dependent acoustic structure.

Transformation of the augmented audio signal may include a digital transformation of the augmented audio signal to provide a digital representation of the augmented audio signal. The digital representation may include for example, a spectrogram representation of audio, a wavelet audio representation of audio, an STFT representation of audio, a time-domain representation of audio, or another type of audio transformation representation of the augmented audio signal.

The at least one audio data object set may represent audio features related to the augmented audio signal. In some examples, the at least one audio data object set may represent physical features and/or perceptual features related to the augmented audio signal. For instance, an audio feature may comprise: one or more: transfer function features, delay of arrival features, timbre features, audio spectrum features, magnitude features, phase features, pitch features, harmonic features, MFCC features, performance features, performance sequencer features, tempo features, time signature features, time-domain signal features, and/or other types of features associated with the augmented audio signal.

In some examples, the at least one microphone sensor is configured as a microphone array. In some examples, at least one other microphone sensor in the microphone array is positioned at least proximate to a different directionally dependent acoustic structure configured to augment audio with different transfer function data than the directionally dependent acoustic structure. In some examples, the microphone array includes a linear array, a planar array, or a 3D array. Alternatively, in some examples, at least one other microphone sensor in the microphone array is separated from the at least one microphone sensor by the directionally dependent acoustic structure and is configured to augment audio with different transfer function data than the directionally dependent acoustic structure.

In some examples, a number of directionally dependent acoustic structures corresponds to a number of microphone sensors utilized by an audio signal processing apparatus (e.g., the audio signal processing apparatus 100) to generate the augmented audio signal.

In some examples, a number of directionally dependent acoustic structures is less than a number of microphone sensors utilized by an audio signal processing apparatus (e.g., the audio signal processing apparatus 100) to generate the augmented audio signal.

In some examples, a number of directionally dependent acoustic structures is greater than a number of microphone sensors utilized by an audio signal processing apparatus (e.g., the audio signal processing apparatus 100) to generate the augmented audio signal.

The process 600 also includes an operation 604 that inputs (e.g., by the audio signal modeling circuitry 208) the at least one audio data object set to a model configured to generate at least one spatialization data structure indicative of spatialization information for at least one audio source located within the audio environment. The model may be a digital signal processing model, a machine learning model, and/or an artificial intelligence model. The spatialization information included in the at least one spatialization data structure may comprise: one or more: 2D polar coordinates, 3D coordinates, audio channel features, audio balance features, audio directionality features, frequency response features, and/or other spatialization information. In some examples, the at least one spatialization data structure digitally represents audio spatialization predictions for the audio environment. In some examples, the spatialization information includes three-dimensional coordinates and/or audio channel features associated with the audio environment.

The process 600 also includes an operation 606 that generates (e.g., by the audio processing circuitry 210) audio processing data based at least in part on the at least one spatialization data structure. The audio processing data may be an output audio signal for the augmented audio signal. In some examples, the audio processing data represents data to process the audio signal and/or the at least one microphone sensor. Additionally or alternatively, the audio processing data may include spatial information for the audio environment to steer microphone beams of the at least one microphone sensors, to perform tuning (e.g., digital signal processing tuning) of the at least one microphone sensors, to provide analytics related to the at least one microphone sensors, to provide the spatial information to a third-party system (e.g., a video camera system, a virtual reality system, etc.), and/or to perform one or more other types of audio processing.

In some examples, the process 600 additionally or alternatively includes outputting the audio processing data via at least one audio output device. In some examples, the process 600 additionally or alternatively includes generating an output audio signal for the augmented audio signal based on the at least one spatialization data structure. In some examples, the process 600 additionally or alternatively includes configuring the output audio signal in a three-dimensional audio format based on the at least one spatialization data structure. In some examples, the three-dimensional audio format is an MPEG-H audio format.

In some examples, the at least one spatialization data structure includes localization data for at least one audio source in the audio environment. In some examples, the process 600 additionally or alternatively includes transmitting the output audio signal based on the localization data.

In some examples, the at least one spatialization data structure includes isolated audio data for at least one audio source in the audio environment. In some examples, the process 600 additionally or alternatively includes configuring the output audio signal based on the isolated audio data.

In some examples, the process 600 additionally or alternatively includes tuning the at least one microphone sensor based on the at least one spatialization data structure. In some examples, the process 600 additionally or alternatively includes dynamically configuring the directionally dependent acoustic structure based on the at least one spatialization data structure. In some examples, the dynamic configuration of the directionally dependent acoustic structure comprises altering an orientation, stiffness, and/or acoustic damping characteristics of the directionally dependent acoustic structure.

In some examples, the process 600 additionally or alternatively includes removing transfer function data from the augmented audio signal to generate an output audio signal. In some examples, the transfer function data is associated with a transfer function of the directionally dependent acoustic structure. In some examples, the transfer function data includes directionally-dependent transfer function data associated with the directionally dependent acoustic structure.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time.

In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Although example processing systems have been described in the figures herein, implementations of the subject matter and the functional operations described herein may be implemented in other types of digital electronic circuitry, or in computer software, firmware, or hardware, including the structures disclosed in this specification and their structural equivalents, or in combinations of one or more of them.

Embodiments of the subject matter and the operations described herein may be implemented in digital electronic circuitry, or in computer software, firmware, or hardware, including the structures disclosed in this specification and their structural equivalents, or in combinations of one or more of them. Embodiments of the subject matter described herein may be implemented as one or more computer programs, i.e., one or more modules of computer program instructions, encoded on computer-readable storage medium for execution by, or to control the operation of, information/data processing apparatus. Alternatively, or in addition, the program instructions may be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium may be, or be included in, a computer-readable storage device, a computer-readable storage substrate, a random or serial access memory array or device, or a combination of one or more of them. Moreover, while a computer-readable storage medium is not a propagated signal, a computer-readable storage medium may be a source or destination of computer program instructions encoded in an artificially-generated propagated signal. The computer-readable storage medium may also be, or be included in, one or more separate physical components or media (e.g., multiple CDs, disks, or other storage devices).

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms, such as consisting of, consisting essentially of, comprised substantially of, and/or the like.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

While this specification contains many specific implementation details, these should not be construed as limitations on the scope of any disclosures or of what may be claimed, but rather as description of features specific to particular embodiments of particular disclosures. Certain features that are described herein in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems may generally be integrated together in a product or packaged into multiple products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. An audio signal processing apparatus configured to process an audio signal originating from an audio environment, the audio signal processing apparatus comprising: at least one microphone sensor; a directionally dependent acoustic structure positioned proximate to the at least one microphone sensor and configured to augment an audio signal captured by the at least one microphone sensor to define an augmented audio signal; and/or augmented audio signal processing circuitry comprising at least one processor and a memory storing instructions.

Clause 2. The audio signal processing apparatus of clause 1, wherein the instructions are operable, when executed by the at least one processor, to cause the augmented audio signal processing circuitry to: transform the augmented audio signal into at least one audio data object set.

Clause 3. The audio signal processing apparatus of any one of the foregoing clauses, wherein the instructions are further operable to cause the augmented audio signal processing circuitry to: input the at least one audio data object set to a model configured to generate at least one spatialization data structure indicative of spatialization information for at least one audio source located within the audio environment.

Clause 4. The audio signal processing apparatus of any one of the foregoing clauses, wherein the instructions are further operable to cause the augmented audio signal processing circuitry to: generate audio processing data based at least in part on the at least one spatialization data structure.

Clause 5. The audio signal processing apparatus of any one of the foregoing clauses, wherein the instructions are further operable to cause the augmented audio signal processing circuitry to: generate an output audio signal for the augmented audio signal based on the at least one spatialization data structure.

Clause 6. The audio signal processing apparatus of any one of the foregoing clauses, wherein the instructions are further operable to cause the augmented audio signal processing circuitry to: configure the output audio signal in a three-dimensional audio format based on the at least one spatialization data structure.

Clause 7. The audio signal processing apparatus of any one of the foregoing clauses, wherein the three-dimensional audio format is an MPEG-H audio format.

Clause 8. The audio signal processing apparatus of any one of the foregoing clauses, wherein the at least one spatialization data structure comprises localization data for at least one audio source in the audio environment, and wherein the instructions are further operable to cause the augmented audio signal processing circuitry to: transmit the output audio signal based on the localization data.

Clause 9. The audio signal processing apparatus of any one of the foregoing clauses, wherein the at least one spatialization data structure comprises isolated audio data for at least one audio source in the audio environment, and wherein the instructions are further operable to cause the augmented audio signal processing circuitry to: configure the output audio signal based on the isolated audio data.

Clause 10. The audio signal processing apparatus of any one of the foregoing clauses, wherein the instructions are further operable to cause the augmented audio signal processing circuitry to: tune the at least one microphone sensor based on the at least one spatialization data structure.

Clause 11. The audio signal processing apparatus of any one of the foregoing clauses, wherein the instructions are further operable to cause the augmented audio signal processing circuitry to: dynamically configure the directionally dependent acoustic structure based on the at least one spatialization data structure.

Clause 12. The audio signal processing apparatus of any one of the foregoing clauses, wherein the dynamic configuration of the directionally dependent acoustic structure comprises at least one of altering an orientation, stiffness, or acoustic damping characteristics of the directionally dependent acoustic structure.

Clause 13. The audio signal processing apparatus of any one of the foregoing clauses, wherein the instructions are further operable to cause the augmented audio signal processing circuitry to: remove transfer function data from the augmented audio signal to generate an output audio signal.

Clause 14. The audio signal processing apparatus of any one of the foregoing clauses, wherein the transfer function data is associated with a transfer function of the directionally dependent acoustic structure.

Clause 15. The audio signal processing apparatus of any one of the foregoing clauses, wherein the transfer function data comprises directionally-dependent transfer function data associated with the directionally dependent acoustic structure.

Clause 16. The audio signal processing apparatus of any one of the foregoing clauses, wherein the instructions are further operable to cause the augmented audio signal processing circuitry to: configure the model as a machine learning model.

Clause 17. The audio signal processing apparatus of any one of the foregoing clauses, wherein the instructions are further operable to cause the augmented audio signal processing circuitry to: configure the model as a digital signal processing model.

Clause 18. The audio signal processing apparatus of any one of the foregoing clauses, wherein a number of directionally dependent acoustic structures corresponds to a number of microphone sensors utilized by the audio signal processing apparatus.

Clause 19. The audio signal processing apparatus of any one of the foregoing clauses, wherein a number of directionally dependent acoustic structures is less than a number of microphone sensors utilized by the audio signal processing apparatus.

Clause 20. The audio signal processing apparatus of any one of the foregoing clauses, wherein a number of directionally dependent acoustic structures is greater than a number of microphone sensors utilized by the audio signal processing apparatus.

Clause 21. The audio signal processing apparatus of any one of the foregoing clauses, wherein the at least one microphone sensor is configured as a microphone array.

Clause 22. The audio signal processing apparatus of any one of the foregoing clauses, wherein at least one other microphone sensor in the microphone array is positioned at least proximate to a different directionally dependent acoustic structure configured to augment audio with different transfer function data than the directionally dependent acoustic structure.

Clause 23. The audio signal processing apparatus of any one of the foregoing clauses, wherein the microphone array comprises a linear array, a planar array, or a three-dimensional (3D) array.

Clause 24. The audio signal processing apparatus of any one of the foregoing clauses, wherein at least one other microphone sensor in the microphone array is separated from the at least one microphone sensor by the directionally dependent acoustic structure and is configured to augment audio with different transfer function data than the directionally dependent acoustic structure.

Clause 25. The audio signal processing apparatus of any one of the foregoing clauses, wherein the directionally dependent acoustic structure is a three-dimensional structure configured to augment audio captured by the at least one microphone sensor with transfer function data associated with the three-dimensional structure in order to provide the augmented audio signal.

Clause 26. The audio signal processing apparatus of any one of the foregoing clauses, wherein the augmented audio signal is an augmented version of the audio signal based on a transfer function associated with the directionally dependent acoustic structure.

Clause 27. The audio signal processing apparatus of any one of the foregoing clauses, wherein the at least one audio data object set represents audio features related to the augmented audio signal.

Clause 28. The audio signal processing apparatus of any one of the foregoing clauses, wherein the at least one spatialization data structure digitally represents audio spatialization predictions for the audio environment.

Clause 29. The audio signal processing apparatus of any one of the foregoing clauses, wherein the spatialization information comprises at least one of three-dimensional coordinates or audio channel features associated with the audio environment.

Clause 30. The audio signal processing apparatus of any one of the foregoing clauses, wherein the audio processing data represents data to process at least one of the audio signal and the at least one microphone sensor.

Clause 31. The audio signal processing apparatus of any one of the foregoing clauses, wherein the instructions are further operable to cause the augmented audio signal processing circuitry to: output the audio processing data via at least one audio output device.

Clause 32. A computer-implemented method comprising steps in accordance with any one of the foregoing clauses.

Clause 33. A computer program product, stored on a computer readable medium, comprising instructions that, when executed by one or more processors of the audio signal processing apparatus, cause the one or more processors to perform one or more operations related to any one of the foregoing clauses.

Clause 34. An audio signal processing apparatus, comprising: a directionally dependent acoustic structure and/or augmented audio signal processing circuitry comprising at least one processor and a memory storing instructions.

Clause 35. The audio signal processing apparatus of clause 34, wherein the directionally dependent acoustic structure is positioned proximate to at least one microphone sensor and is configured to define an augmented audio signal.

Clause 36. The audio signal processing apparatus any one of the foregoing clauses, wherein the instructions are operable, when executed by the at least one processor, to cause the augmented audio signal processing circuitry to: transform the augmented audio signal into at least one audio data object set.

Clause 37. The audio signal processing apparatus of any one of the foregoing clauses, wherein the instructions are further operable to cause the augmented audio signal processing circuitry to: generate at least one spatialization data structure based at least in part on the at least one audio data object set.

Clause 38. The audio signal processing apparatus any one of the foregoing clauses, wherein the instructions are further operable to cause the augmented audio signal processing circuitry to: generate audio processing data based at least in part on the at least one spatialization data structure.

Clause 34. A computer-implemented method comprising steps in accordance with any one of the foregoing clauses 34-38.

Clause 40. A computer program product, stored on a computer readable medium, comprising instructions that, when executed by one or more processors of the audio signal processing apparatus, cause the one or more processors to perform one or more operations related to any one of the foregoing clauses 34-38.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An audio signal processing apparatus configured to process an audio signal originating from an audio environment, the audio signal processing apparatus comprising:

at least one microphone sensor;

a directionally dependent acoustic structure positioned proximate to the at least one microphone sensor and configured to augment an audio signal captured by the at least one microphone sensor to define an augmented audio signal; and augmented audio signal processing circuitry comprising at least one processor and a memory storing instructions that are operable, when executed by the at least one processor, to cause the augmented audio signal processing circuitry to:

transform the augmented audio signal into at least one audio data object set;

input the at least one audio data object set to a model configured to generate at least one spatialization data structure indicative of spatialization information for at least one audio source located within the audio environment; and generate audio processing data based at least in part on the at least one spatialization data structure.

2. The audio signal processing apparatus of claim 1, wherein the instructions are further operable to cause the augmented audio signal processing circuitry to:

generate an output audio signal for the augmented audio signal based on the at least one spatialization data structure.

3. The audio signal processing apparatus of claim 2, wherein the instructions are further operable to cause the augmented audio signal processing circuitry to:

configure the output audio signal in a three-dimensional audio format based on the at least one spatialization data structure.

4. The audio signal processing apparatus of claim 2, wherein the at least one spatialization data structure comprises localization data for at least one audio source in the audio environment, and wherein the instructions are further operable to cause the augmented audio signal processing circuitry to:

transmit the output audio signal based on the localization data.

5. The audio signal processing apparatus of claim 2, wherein the at least one spatialization data structure comprises isolated audio data for at least one audio source in the audio environment, and wherein the instructions are further operable to cause the augmented audio signal processing circuitry to:

configure the output audio signal based on the isolated audio data.

6. The audio signal processing apparatus of claim 1, wherein the instructions are further operable to cause the augmented audio signal processing circuitry to:

tune the at least one microphone sensor based on the at least one spatialization data structure.

7. The audio signal processing apparatus of claim 1, wherein the instructions are further operable to cause the augmented audio signal processing circuitry to:

dynamically configure the directionally dependent acoustic structure based on the at least one spatialization data structure.

8. The audio signal processing apparatus of claim 1, wherein the instructions are further operable to cause the augmented audio signal processing circuitry to:

remove transfer function data from the augmented audio signal to generate an output audio signal, wherein the transfer function data is associated with a transfer function of the directionally dependent acoustic structure.

9. The audio signal processing apparatus of claim 1, wherein a number of directionally dependent acoustic structures corresponds to a number of microphone sensors utilized by the audio signal processing apparatus.

10. The audio signal processing apparatus of claim 1, wherein a number of directionally dependent acoustic structures is less than a number of microphone sensors utilized by the audio signal processing apparatus.

11. The audio signal processing apparatus of claim 1, wherein a number of directionally dependent acoustic structures is greater than a number of microphone sensors utilized by the audio signal processing apparatus.

12. The audio signal processing apparatus of claim 1, wherein the directionally dependent acoustic structure is a three-dimensional structure configured to augment audio captured by the at least one microphone sensor with transfer function data associated with the three-dimensional structure in order to provide the augmented audio signal.

13. A computer-implemented method performed by an audio signal processing apparatus, comprising:

transforming an augmented audio signal into at least one audio data object set, wherein the augmented audio signal is defined based at least in part on a directionally dependent acoustic structure positioned proximate to at least one microphone sensor;

inputting the at least one audio data object set to a model configured to generate at least one spatialization data structure indicative of spatialization information for at least one audio source located within an audio environment;

generating audio processing data based at least in part on the at least one spatialization data structure; and outputting the audio processing data via at least one audio output device.

14. The computer-implemented method of claim 13, further comprising:

generating an output audio signal for the augmented audio signal based on the at least one spatialization data structure.

15. The computer-implemented method of claim 14, further comprising:

configuring the output audio signal in a three-dimensional audio format based on the at least one spatialization data structure.

16. The computer-implemented method of claim 14, wherein the at least one spatialization data structure comprises localization data for at least one audio source in the audio environment, and the computer-implemented method further comprising:

transmitting the output audio signal based on the localization data.

17. The computer-implemented method of claim 14, wherein the at least one spatialization data structure comprises isolated audio data for at least one audio source in the audio environment, and the computer-implemented method further comprising:

configuring the output audio signal based on the isolated audio data.

18. The computer-implemented method of claim 13, further comprising:

tuning the at least one microphone sensor based on the at least one spatialization data structure.

19. The computer-implemented method of claim 13, further comprising:

dynamically configuring the directionally dependent acoustic structure based on the at least one spatialization data structure.

20. A computer program product, stored on a non-transitory computer readable medium, comprising instructions that, when executed by one or more processors of an audio signal processing apparatus, cause the one or more processors to:

transform an augmented audio signal into at least one audio data object set, wherein the augmented audio signal is defined based at least in part on a directionally dependent acoustic structure positioned proximate to at least one microphone sensor;

input the at least one audio data object set to a model configured to generate at least one spatialization data structure indicative of spatialization information for at least one audio source located within an audio environment;

generate audio processing data based at least in part on the at least one spatialization data structure; and output the audio processing data via at least one audio output device.

* * * * *